US009851768B2

(12) United States Patent
Hua

(10) Patent No.: US 9,851,768 B2
(45) Date of Patent: Dec. 26, 2017

(54) VOLTAGE REGULATOR CONTROL SYSTEM

(75) Inventor: Chanh V Hua, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 353 days.

(21) Appl. No.: 14/376,136

(22) PCT Filed: Apr. 20, 2012

(86) PCT No.: PCT/US2012/034502
§ 371 (c)(1),
(2), (4) Date: Jul. 31, 2014

(87) PCT Pub. No.: WO2013/158116
PCT Pub. Date: Oct. 24, 2013

(65) Prior Publication Data
US 2014/0380070 A1 Dec. 25, 2014

(51) Int. Cl.
G06F 1/26 (2006.01)
G06F 1/32 (2006.01)

(52) U.S. Cl.
CPC .............. *G06F 1/26* (2013.01); *G06F 1/3237* (2013.01); *G06F 1/3296* (2013.01); *Y02B 60/1221* (2013.01); *Y02B 60/1285* (2013.01)

(58) Field of Classification Search
CPC ........ G06F 1/26; G06F 1/3237; G06F 1/3296; G06F 1/32; Y02B 60/1221; Y02B 60/1285
USPC .................................................. 713/300, 320
See application file for complete search history.

(56) References Cited

U.S. PATENT DOCUMENTS

| 5,744,944 A | 4/1998 | Danstrom |
| 6,105,142 A | 8/2000 | Goff et al. |
| 6,772,356 B1 | 8/2004 | Qureshi et al. |
| 7,155,617 B2 | 12/2006 | Gary et al. |
| 7,562,245 B1 | 7/2009 | Cai et al. |
| 7,603,575 B2 | 10/2009 | Woodbridge et al. |
| 7,650,518 B2 | 1/2010 | Allarey et al. |
| 7,822,967 B2 | 10/2010 | Fung |
| 7,873,847 B2 | 1/2011 | Bozek et al. |
| 8,001,394 B2 | 8/2011 | Bose et al. |
| 8,103,884 B2 | 1/2012 | Brey et al. |
| 8,161,312 B2 | 4/2012 | Cai et al. |
| 8,477,514 B2 | 7/2013 | Artusi et al. |

(Continued)

FOREIGN PATENT DOCUMENTS

CN 101231551 A 7/2008

OTHER PUBLICATIONS

Intel, "VR12/IMVP7 Pulse Width Modulation (PWM) Specification", Revision 1.4, Published 2009, pp. 19 and 37.*

(Continued)

*Primary Examiner* — Nitin Patel
(74) *Attorney, Agent, or Firm* — Tarolli, Sundheim, Covell & Tummino L.L.P.

(57) ABSTRACT

A processor power management system and method are disclosed. The system includes a voltage regulator control system that is communicatively coupled to each of a plurality of processors. The voltage regulator control system is to generate a processor voltage that is provided to each of the plurality of processors and to control a magnitude of the processor voltage based on receiving power management request signal s that are provided from each of the plurality of processors.

11 Claims, 3 Drawing Sheets

(56) References Cited

U.S. PATENT DOCUMENTS

| | | | |
|---|---|---|---|
| 2005/0071693 A1* | 3/2005 | Chun | G06F 1/3203 713/300 |
| 2006/0053326 A1* | 3/2006 | Naveh | G06F 1/3203 713/323 |
| 2008/0005592 A1 | 1/2008 | Allarey et al. | |
| 2008/0271035 A1 | 10/2008 | Yasukawa | |
| 2009/0070607 A1* | 3/2009 | Safford | G06F 1/3234 713/320 |
| 2009/0138737 A1* | 5/2009 | Kim | G06F 1/324 713/322 |
| 2009/0158071 A1 | 6/2009 | Ooi et al. | |
| 2009/0249092 A1* | 10/2009 | Lam | G06F 1/26 713/310 |
| 2009/0328055 A1 | 12/2009 | Bose | |
| 2010/0083387 A1* | 4/2010 | Rodgers | G06F 21/81 726/36 |
| 2010/0162256 A1* | 6/2010 | Branover | G06F 1/3203 718/104 |
| 2010/0332877 A1* | 12/2010 | Yarch | G06F 1/3203 713/323 |
| 2011/0213991 A1 | 9/2011 | Wolfe et al. | |
| 2012/0054515 A1 | 3/2012 | Naffziger | |
| 2012/0166845 A1* | 6/2012 | Henry | G06F 1/3206 713/323 |

OTHER PUBLICATIONS

EPO, Extended Search Report, dated Jul. 31, 2015, EP App. No. 12874521.3.

Juliana Gjanci, "On-Chip Voltage Regulation for Power Management in System-on-Chip," http://www.ece.uic.edu/~masud/Juliana_MS_THESIS_final.pdf, 2008.

PCT/ISA/KR, International Search Report, dated Nov. 30, 2012, PCT/US2012/034502, 9 pps.

* cited by examiner

VOLTAGE REGULATOR CONTROL SYSTEM

BACKGROUND

A high-performance processor, such as one that can be implemented in a variety of computer and portable electronic devices, can receive power from a voltage regulator that generates a processor voltage. The processor can control the voltage regulator that provides its power to optimize for performance and efficiency. For example, when a heavy computational load is required, the processor can send a command to the voltage regulator to increase the processor voltage to substantially meet the needs of the processor. As another example, when the processor does not require a heavy computational load, the processor can issue a command to decrease the processor voltage and to deactivate unnecessary components to conserve power.

DETAILED DESCRIPTION

Figure 1:
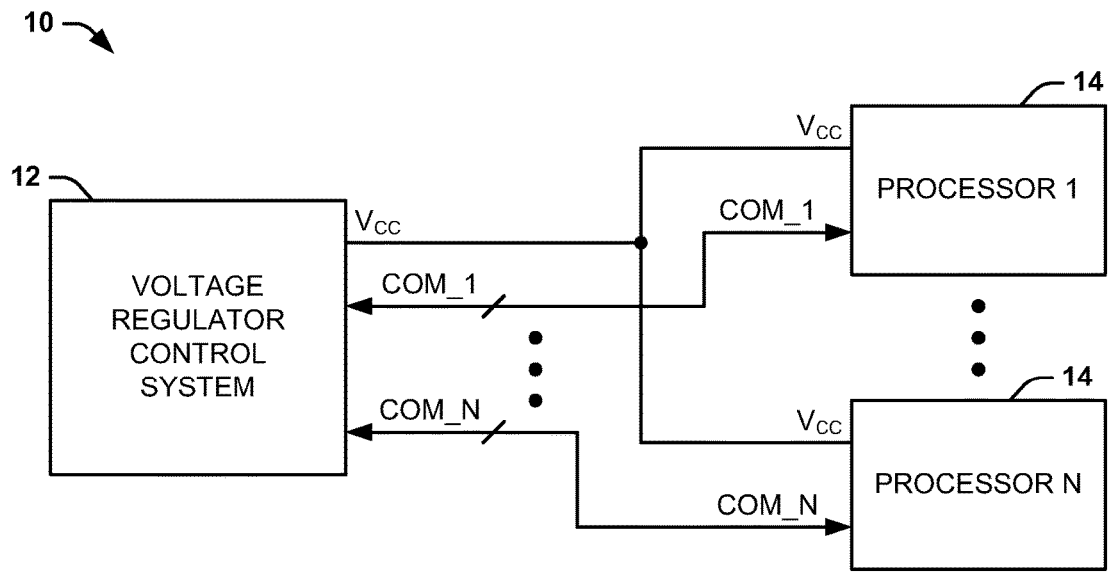
FIG. 1 illustrates an example of a power management system.

FIG. 1 illustrates a power management system 10. The power management system 10 includes a voltage regulator control system 12 and a plurality N of processors 14, where N is a positive integer greater than one. As an example, the power management system 10 can be implemented in a variety of computer systems and/or portable electronic devices, such as laptop or tablet computers or in wireless communication devices. The plurality of processors 14 can be configured as low-power processors that are implemented, for example, instead of a single high-performance processor, such that the plurality of processors can provide a substantially more efficient processing system.

The voltage regulator control system 12 is communicatively coupled to each of the plurality of processors 14 via a respective plurality of signals COM. In the example of FIG. 1, the signals COM are demonstrated respectively as COM_1 through COM_N corresponding to each of the respective N processors. As an example, each of the signals COM_1 through COM_N can be communicated between the voltage regulator control system 12 and the respective processors 14 via a Serial Voltage IDentification (SVID) bus or another type of communication bus. The voltage regulator control system 12 is also configured to generate a processor voltage $V_{CC}$ that is provided to each of the processors 14 to provide power to the processors 14. As an example, the voltage regulator control system 14 can include one or more power supplies, with at least one of the power supplies being configured to generate the processor voltage $V_{CC}$.

As an example, the processors 14 can be configured to individually switch between an active mode and a low power mode. The active mode can correspond to a mode in which a respective one of the processors 14 is performing a substantial amount of processing capability (e.g., based on substantially high computational resource requirements). Therefore, the active mode can require a relatively higher magnitude of the processor voltage $V_{CC}$ to support the power requirements of the processing performance of the active mode. Conversely, the low power mode can correspond to a mode in which a respective one of the processors 14 is in an idle mode (e.g., sleep mode) or is performing a nominal processing capability (e.g., based on substantially low computational resource requirements). Therefore, the low power mode does not require the relatively higher magnitude of the processor voltage $V_{CC}$, and thus can operate based on a relatively low magnitude of the processor voltage $V_{CC}$ to substantially conserve power consumption for more efficient operation of the power management system 10. While it is described herein that the processors 14 operate in either an active mode or a low power mode, it is to be understood that the processors 14 can be configured to operate in a plurality of additional voltage levels, such as based on the respective workloads required by the processor. Therefore, as described herein, switching from the active mode to the low power mode can correspond to any transition of the processor voltage $V_{CC}$ from a relatively higher magnitude to a relatively lower magnitude, and switching from the low power mode to the active mode can correspond to any transition of the processor voltage $V_{CC}$ from a relatively lower magnitude to a relatively higher magnitude.

The voltage regulator control system 12 can be configured to adjust the magnitude of the processor voltage $V_{CC}$ based on one or more power management request signals provided via the signals COM from at least one of the processors 14. For example, one of the processors 14 may need to switch from the low power mode to the active mode, such as based on a requested amount of computational resources, while receiving an insufficient magnitude of the processor voltage $V_{CC}$ for operation in the active mode. Thus, the respective processor 14 can generate a voltage increase request signal via the respective signal COM to the voltage regulator control system 12. As an example, the voltage increase request signal can include one or both of the [01 h-SetVID-fast] or the [02 h-SetVID-slow] commands in a VR12 Specification associated with an SVID bus.

In response to receiving the voltage increase request signal, the voltage regulator control system 12 can be configured to increase the magnitude of the processor voltage $V_{CC}$. The voltage regulator control system 12 can also be configured to issue an alert to each of the remaining processors 14, such as to indicate that the processor voltage $V_{CC}$ is about to increase to support operation in the active mode. Therefore, the remaining processors 14 can likewise switch to the active mode, if necessary, based on having a sufficient magnitude of the processor voltage $V_{CC}$ for operating in the active mode. As an example, the remaining processors 14 can thus switch to the active mode without providing a voltage increase request signal. As another example, any of the processors 14 that switch to the active mode can generate an acknowledgement to the voltage regulator control system 12 to indicate the mode in which the respective processors 14 operate.

As another example, one of the processors 14 may no longer be required to operate in an active mode, and can thus switch to the low power mode in an attempt to conserve power. For example, the processor 14 can revert to an idle mode from the active mode upon substantially completing a given computation or processing operation. Thus, the respective processor 14 can generate a voltage decrease request signal via the respective signal COM to the voltage regulator control system 12. For instance, in the example of the use of an SVID bus, the voltage increase request signal can include one or all of the [01 h-SetVID-fast], the [02 h-SetVID-slow], or [03 h-SetVID-decay] commands in the VR12 Specification.

In response to receiving the voltage decrease request signal, the voltage regulator control system 12 can be configured to determine the current operating mode of each of the remaining processors 14. The voltage regulator control system 12 could thus decrease the magnitude of the processor voltage $V_{CC}$ in response to the voltage decrease request signal and a determination that all of the remaining processors 14 are operating in the low power mode. Therefore, a decreased magnitude of the processor voltage $V_{CC}$ is sufficient for all of the processors 14 to function in the low power mode. However, in response to determining that at least one of the processors 14 operates in the active mode, the voltage regulator control system 12 is configured to maintain the magnitude of processor voltage $V_{CC}$, as opposed to decreasing it in response to the voltage decrease request signal. As a result, the processor 14 operating in the active mode can continue to receive the power sufficient for operation in the active mode based on the relatively greater magnitude of the processor voltage $V_{CC}$.

In addition, the voltage regulator control system 12 can also be configured to issue an alert to each of the remaining processors 14, such as to indicate that the processor voltage $V_{CC}$ is about to decrease. Furthermore, in the event that the voltage regulator control system 12 is unable to decrease the processor voltage $V_{CC}$ based on one of the processors 14 operating in the active mode, the voltage regulator control system 12 can issue an alert to the processor 14 that provided the voltage decrease request signal to inform the respective processor 14 that the processor voltage $V_{CC}$ that the request to decrease the processor voltage $V_{CC}$ cannot be satisfied at that time. As a result, the requesting processor 14 can attempt the request again at a later time, such as periodically. Additionally or alternatively, the voltage regulator control system 12 can queue the request until all of the processors 14 are switched the low power mode. Therefore, the voltage regulator control system 12 can eventually satisfy the request at an appropriate time, and can first provide an alert to all of the processors 14 of an imminent decrease to the processor voltage $V_{CC}$.

As a result of the communicative coupling of the plurality of processors 14 with the voltage regulator control system 12, the voltage regulator control system 12 can effect power management of the plurality of processors 14 in a simple, efficient, and cost effective manner. By transmitting alert signals to all of the processors 14 based on a voltage change request issued by one of the processors 14, the power regulator system 10 can be configured as a centralized, system-wide regulator in which the power requirements of the processors 14 are openly communicated with respect to each other. Thus, the more centralized implementation of the power regulator system 10 for controlling the power of the plurality of processors 14 can operate in a manner that takes into account a multitude of factors, such as total system power, thermal requirements, and other load balancing considerations. In addition, as an example, by implementing the single voltage regulator control system 12 instead of a plurality of voltage regulators associated with the respective plurality of processors 14, the power management system 10 can achieve cost savings based on a reduced set of electronic components and can be implemented in a more compact design. As another example, by implementing a single, larger power supply in the voltage regulator control system 12 relative to smaller power supplies associated with the respective processors 14, the voltage regulator control system 12 can be designed in a more power efficient and flexible manner. Therefore, the power management system 10 can be implemented in a variety of electronic device environments for a more efficient, cost effective, and space-saving design.

Figure 2:
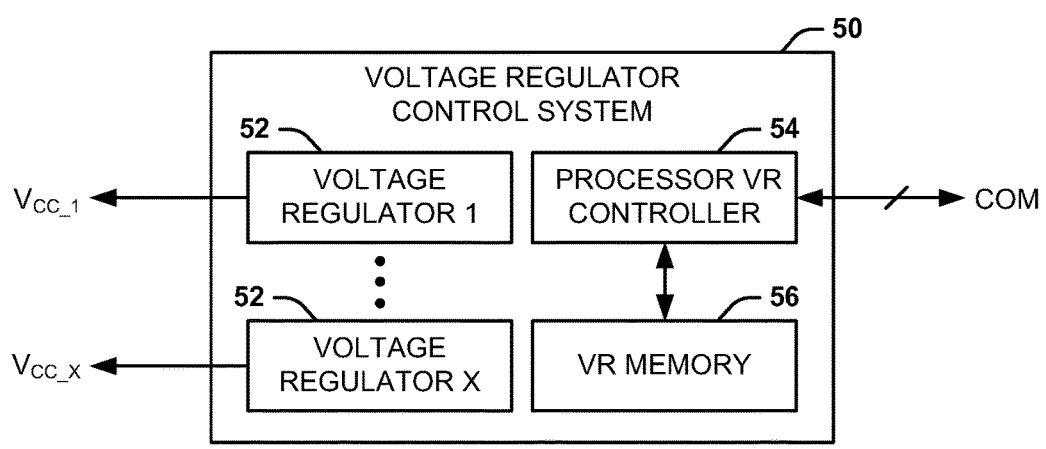
FIG. 2 illustrates an example of a voltage regulator control system.

FIG. 2 illustrates an example of a voltage regulator control system 50. The voltage regulator control system 50 can correspond to the voltage regulator control system 12 in the example of FIG. 1. Therefore, reference is to be made to the example of FIG. 1 in the following description of the example of FIG. 2. In the example of FIG. 2, the voltage regulator control system 50 can be configured as an integrated circuit (IC), such as an application specific integrated circuit (ASIC).

The voltage regulator control system 50 includes a plurality X of voltage regulators 52, where X is a positive integer. In the example of FIG. 2, each of the voltage regulators 52 can be configured to generate a respective voltage $V_{CC}$, demonstrated in the example of FIG. 2 as $V_{CC\_1}$ through $V_{CC\_X}$. As an example, each of the voltage regulators 52 can include at least one power supply to generate the respective voltages $V_{CC\_1}$ through $V_{CC\_CC\_X}$. One of the voltages $V_{CC\_1}$ through $V_{CC\_X}$ can correspond to the processor voltage $V_{CC}$ (e.g., the voltage $V_{CC\_1}$) in the example of FIG. 1. Therefore, the voltage regulator control system 50 can provide the remaining voltages (e.g., the voltages $V_{CC\_2}$ through $V_{CC\_X}$) to other components in an associated computer system that includes the voltage regulator control system 50. While the example of FIG. 2 demonstrates that the voltage regulator control system 50 includes at least two voltage regulators 52, it is to be understood that X could be equal to one, such that the voltage regulator control system 50 generates only a single processor voltage $V_{CC}$.

The voltage regulator control system 50 also includes a processor voltage regulator (VR) controller 54 and a VR memory 56 that are communicatively coupled together. The processor VR controller 54 can be configured as a processor or a logic controller that is communicatively coupled to the processors 14 via the signal COM, which can be configured as one or more buses. The processor VR controller 54 can thus be configured to process requests that are provided from the respective processors 14 and can issue alerts to the respective processors 14 via the signals COM. It is to be understood that the VR memory 56 can be a memory specific to the processor VR controller 54, such that the plurality of processors 14 of the power management system 10 can be communicatively coupled with a separate memory (not shown). Alternatively, the VR memory 56 could be implemented as part of an overall memory system, such as including memory associated with the processors 14.

As an example, the processor VR controller 54 can be configured to buffer requests that are provided by the processors 14 in the VR memory 56. The processor VR controller 54 can also be configured to store status conditions and parameters associated with regulating the power of each of the respective processors 14 in the VR memory 56. For example, the parameters can include data associated with a maximum current requirement of each of the processors 14, a slew-rate of the current (i.e., di/dt) for each of the processors 14, and a variety of other parameters associated with power regulation of each of the respective processors 14. Such parameters associated with each of the processors 14 can be different for each of the respective processors 14, and can change over the operation life of the respective processors 14.

The VR memory 56 can include a set of memory registers that are specific to each of the respective processors 14. Therefore, the processor VR controller 54 can be configured to set address pointers within the VR memory 56 to correspond to a given one of the processors 14 from which a respective message is provided to the voltage regulator control system 50. As an example, the processor VR controller 54 can be configured to designate specific memory registers to each of the respective processors 14, such as during a boot-up operation of the associated computer system in which the voltage regulator control system 50 is included. Thus, the processor VR controller 54 can manage the VR memory 56 with respect to the processors 14. Accordingly, commands communicated between the processor VR controller 54 and the processors 14 can be buffered and/or stored in the specific registers of the VR memory 56 in a manner that is substantially transparent to the processors 14.

Figure 3:
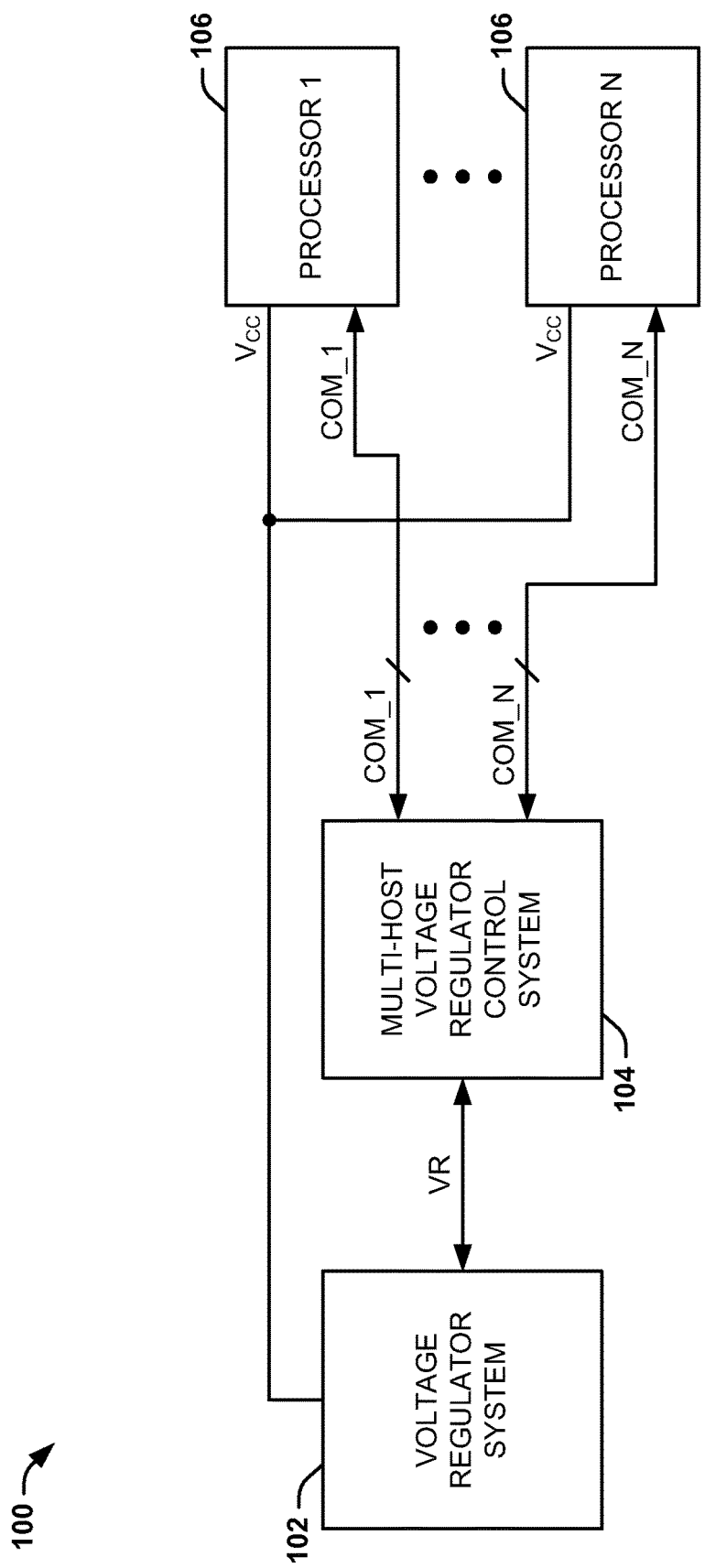
FIG. 3 illustrates another example of a power management system.

FIG. 3 illustrates another example of a power management system 100. The power management system 100 includes a voltage regulator system 102, a multi-host voltage regulator control system 104, and a plurality N of processors 106, where N is a positive integer greater than one. As an example, the power management system 100 can be implemented in a variety of computer systems and/or portable electronic devices, such as laptop or tablet computers or in wireless communication devices. As an example, the voltage regulator system 102 and the multi-host voltage regulator control system 104 can be implemented as separate systems, such as separate ICs, or can be implemented as a single system, such as in a common IC.

The multi-host voltage regulator control system 104 is communicatively coupled to each of the plurality of processors 106 via a respective plurality of signals COM_1 through COM_N, in a manner similar to as described in the example of FIG. 1. As an example, each of the signals COM_1 through COM_N can be communicated between the multi-host voltage regulator control system 104 and the respective processors 106 via a Serial Voltage IDentification (SVID) bus. The multi-host voltage regulator control system 104 is also communicatively coupled to the voltage regulator system 102, demonstrated in the example of FIG. 3 as via a signal VR. The voltage regulator system 102 is configured to generate a processor voltage $V_{CC}$ that is provided to each of the processors 106 to provide power to the processors 106. As an example, the voltage regulator system 102 can include one or more power supplies, with at least one of the power supplies being configured to generate the processor voltage $V_{CC}$.

The power management system 100 is therefore configured substantially similar to the power management system 10 in the example of FIG. 1. However, the functionality of the voltage regulator control system 12 in the example of FIG. 1 is distributed between the voltage regulator system 102 and the multi-host voltage regulator control system 104 in the power management system 100 in the example of FIG. 3. Specifically, the multi-host voltage regulator control system 104 can receive and process the power management requests provided from the processors 106, as well as issue alerts to the processors 106, via the signals COM_1 through COM_N. In response to the processing of the requests via the signals COM_1 through COM_N, the multi-host voltage regulator control system 104 can provide commands to the voltage regulator system 102 via the signal VR to increase or decrease the processor voltage $V_{CC}$. As a result, the voltage regulator system 102 can be configured substantially similar to a conventional voltage regulator system 102 that controls a processor voltage $V_{CC}$ for a single processor, while the multi-host voltage regulator control system 104 includes all of the intelligence for managing the power of all of the processors 106.

Figure 4:
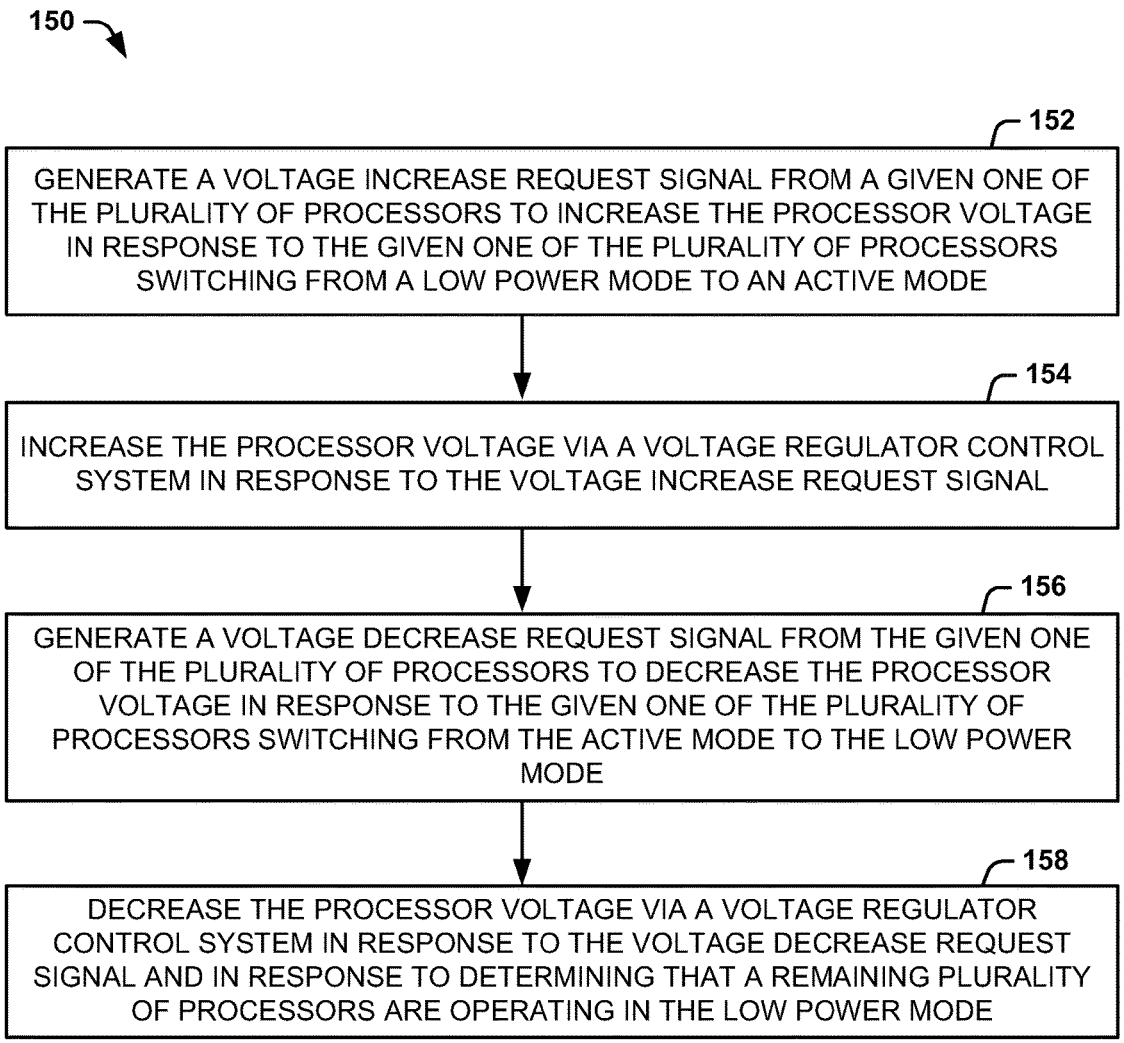
FIG. 4 illustrates an example method for controlling a processor voltage that is provided to each of a plurality of processors.

In view of the foregoing structural and functional features described above, an example method will be better appreciated with reference to FIG. 4. While, for purposes of simplicity of explanation, the method of FIG. 4 is shown and described as executing serially, it is to be understood and appreciated that the method is not limited by the illustrated order, as parts of the method could occur in different orders and/or concurrently from that shown and described herein.

FIG. 4 illustrates an example of a method 150 for controlling a processor voltage that is provided to each of a plurality of processors. At 152, a voltage increase request signal (e.g., via a signal COM) is generated from a given one of the plurality of processors (e.g., a processor 14) to increase the processor voltage (e.g., the voltage $V_{CC}$) in response to the given one of the plurality of processors switching from a low power mode to an active mode. At 154, the processor voltage is increased via a voltage regulator control system (e.g., the voltage regulator control system 12) in response to the voltage increase request signal. At 156, a voltage decrease request signal is generated from the given one of the plurality of processors to decrease the processor voltage in response to the given one of the plurality of processors switching from the active mode to the low power mode. At 158, the processor voltage is decreased via a voltage regulator control system in response to the voltage decrease request signal and in response to determining that a remaining plurality of processors are operating in the low power mode.

What have been described above are examples. It is, of course, not possible to describe every conceivable combination of components or methodologies, but one of ordinary skill in the art will recognize that many further combinations and permutations are possible. Accordingly, the invention is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A voltage regulator control system comprising a single voltage regulator, the single voltage regulator communicatively coupled directly to each of a plurality of processors, the single voltage regulator to:
   control a magnitude of a processor voltage based on receiving at least one power management request signal from each of the plurality of processors;
   generate a processor voltage that is provided to each of the plurality of processors; and
   in response to a voltage change request issued by one of the plurality of processors to the single voltage regulator to increase or decrease the processor voltage, transmit an alert signal to each of the remaining plurality of processors.

2. The system of claim 1, wherein the voltage regulator control system comprises a voltage regulator memory, wherein the voltage regulator control system is to designate respective registers of the voltage regulator memory that are each individually dedicated to each of the respective plurality of processors.

3. The system of claim 1, wherein the voltage regulator control system is to reduce the processor voltage in response to a power management request signal from one of the plurality of processors in response to each of a remaining plurality of processors operating in a low power mode, such that the processor voltage provides sufficient power to the remaining plurality of processors upon being reduced.

4. The system of claim 1, wherein each of the plurality of processors is to generate a request to the voltage regulator control system to decrease the processor voltage in response to switching from an active mode to a low voltage mode, and wherein the voltage regulator control system is to provide an alert signal to a respective one of the plurality of processors in response to receiving the request and being unable to reduce the processor voltage based on power required by another one of the plurality of processors.

5. The system of claim 1, wherein the voltage regulator control system comprises:
 a multi-host voltage regulator control system that is communicatively coupled to each of the plurality of processors to transmit and receive power management commands to and from the plurality of processors;
 a voltage regulator system communicatively coupled to the multi-host voltage regulator control system to generate and control the magnitude of the processor voltage based on receiving commands that are provided from the multi-host voltage control regulator system.

6. The system of claim 1, wherein the voltage regulator control system and the plurality of processors are to communicate via a Serial Voltage IDentification (SVID) bus.

7. A method for controlling a processor voltage that is provided to each of a plurality of processors by a single voltage regulator, the method comprising:
 receiving, at the single voltage regulator, a voltage increase request signal from a given one of the plurality of processors to increase the processor voltage in response to the given one of the plurality of processors switching from a low power mode to an active mode, and in response, transmit a first alert signal to each of the remaining plurality of processors;
 increasing the processor voltage via the single voltage regulator in response to the voltage increase request signal;
 receiving, at the single voltage regulator, a voltage decrease request signal from the given one of the plurality of processors to decrease the processor voltage in response to the given one of the plurality of processors switching from the active mode to the low power mode; and
  decreasing the processor voltage via the single voltage regulator in response to the voltage decrease request signal and in response to determining that a remaining plurality of processors are operating in the low power mode, and in response, transmit a second alert signal to each of the remaining plurality of processors.

8. The method of claim 7, further comprising providing a third alert signal to the remaining plurality of processors in response to receiving each of the voltage increase request signal and the voltage decrease request signal.

9. The method of claim 7, further comprising maintaining a magnitude of the processor voltage in response to the voltage decrease request signal and in response to determining that at least one of the remaining plurality of processors is operating in the active mode.

10. A power management system comprising:
 a plurality of processors, each of the plurality of processors switchable between operation in an active mode and a low power mode;
 a voltage regulator control system comprising a single voltage regulator, the single voltage regulator communicatively coupled to each of a plurality of processors, the single voltage regulator to:
  generate a processor voltage that is provided to each of the plurality of processors;
  receive a voltage increase request signal from a first one of the plurality of processors to increase the processor voltage in response to the given one of the plurality of processors switching from a low power mode to an active mode
  in response to the first one of the plurality of processors switching to the active mode, increase a magnitude of the processor voltage and transmit a first alert signal to each of the remaining plurality of processors;
  receive a voltage decrease request signal from a second one of the plurality of processors to decrease the processor voltage in response to the second one of the plurality of processors switching from the active mode to the low power mode; and
  in response to the second one of the plurality of processors switching to the low power mode and a determination that a remaining plurality of processors operates in the low power mode, decrease the magnitude of the processor voltage and transmit a second alert signal to each of the remaining plurality of processors.

11. The system of claim 10, wherein the voltage regulator control system comprises a voltage regulator memory, wherein the voltage regulator control system is to designate respective registers of the voltage regulator memory that are each individually dedicated to each of the respective plurality of processors.

* * * * *